US010996386B2

(12) United States Patent
Kwak et al.

(10) Patent No.: US 10,996,386 B2
(45) Date of Patent: *May 4, 2021

(54) OPTICAL FILM WITH HIGH ADHESIVENESS AND EXCELLENT PROPERTY OF BLOCKING UV LIGHT, AND POLARIZING PLATE COMPRISING THE SAME

(71) Applicant: LG CHEM, LTD., Seoul (KR)

(72) Inventors: Sang Min Kwak, Daejeon (KR); Seong Wook Kang, Daejeon (KR); Dong Wan Kim, Daejeon (KR); Kil An Jung, Daejeon (KR); Ki Joong Lee, Daejeon (KR); Min Su Park, Daejeon (KR); Jong Sung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 61 days.

This patent is subject to a terminal disclaimer.

(21) Appl. No.: 16/073,264

(22) PCT Filed: Sep. 19, 2017

(86) PCT No.: PCT/KR2017/010255
§ 371 (c)(1),
(2) Date: Jul. 26, 2018

(87) PCT Pub. No.: WO2018/056672
PCT Pub. Date: Mar. 29, 2018

(65) Prior Publication Data
US 2018/0356577 A1 Dec. 13, 2018

(30) Foreign Application Priority Data

Sep. 20, 2016 (KR) .................. 10-2016-0120102
Sep. 18, 2017 (KR) .................. 10-2017-0119828

(51) Int. Cl.
G02B 5/30 (2006.01)
G02B 1/14 (2015.01)
B32B 37/12 (2006.01)
G02B 1/04 (2006.01)
B29D 7/01 (2006.01)
B29C 55/02 (2006.01)
G02F 1/1335 (2006.01)
B29C 55/14 (2006.01)

(52) U.S. Cl.
CPC .............. G02B 5/30 (2013.01); B29C 55/023 (2013.01); B29D 7/01 (2013.01); B32B 37/12 (2013.01); G02B 1/04 (2013.01); G02B 1/14 (2015.01); B29C 55/143 (2013.01); C09K 2323/035 (2020.08); C09K 2323/057 (2020.08); G02F 1/133528 (2013.01); G02F 2201/50 (2013.01)

(58) Field of Classification Search
CPC .. B32B 37/12; G02B 1/04; G02B 1/14; G02B 5/30; G02F 1/133528; Y10T 428/105; Y10T 428/1077; Y10T 2323/035; Y10T 2323/057

See application file for complete search history.

(56) References Cited

U.S. PATENT DOCUMENTS

| 4,847,316 A * | 7/1989 | Schick .................... C08L 67/00 524/88 |
| 2009/0257003 A1 | 10/2009 | Yoshihara et al. |
| 2013/0281601 A1* | 10/2013 | Aoki ........................ C08K 3/40 524/494 |
| 2014/0072731 A1 | 3/2014 | Seo et al. |
| 2014/0333999 A1* | 11/2014 | Shim .................... C09D 175/16 359/487.02 |
| 2015/0183945 A1 | 7/2015 | Shiraishi et al. |
| 2015/0183977 A1* | 7/2015 | Nimura ...................... C08J 5/18 428/1.33 |
| 2015/0362798 A1 | 12/2015 | Kwon et al. |
| 2016/0231484 A1* | 8/2016 | Shim .................... G02B 5/3041 |
| 2017/0177274 A1 | 6/2017 | Mylly et al. |
| 2018/0299588 A1 | 10/2018 | Kwak et al. |
| 2019/0033495 A1 | 1/2019 | Kwak et al. |

FOREIGN PATENT DOCUMENTS

| CN | 103415584 A | 11/2013 |
| CN | 104834028 A | 8/2015 |
| JP | 01-235904 A | 9/1989 |
| JP | 2009294359 A | 12/2009 |
| JP | 2010204622 A | 9/2010 |
| JP | 2013140390 A | 7/2013 |
| JP | 2014051649 A * | 3/2014 |
| JP | 2015-143842 A | 8/2015 |
| JP | 2015165301 A * | 9/2015 |
| JP | 2015165301 A | 9/2015 |
| JP | 2015210474 A | 11/2015 |
| JP | 2016522912 A | 8/2016 |
| JP | 2018535452 A | 11/2018 |
| JP | 2019507918 A | 3/2019 |
| JP | 2019509517 A | 4/2019 |
| KR | 1020080037905 A | 5/2008 |
| KR | 20100084918 A * | 7/2010 |
| KR | 1020100084918 A | 7/2010 |
| KR | 101124581 B1 * | 3/2012 |
| KR | 1020130108082 A | 10/2013 |
| KR | 101462579 B1 | 11/2014 |
| KR | 1020140146391 A | 12/2014 |
| KR | 1020160038324 A | 4/2016 |
| KR | 1020160062901 A | 6/2016 |
| KR | 1020160101453 A | 8/2016 |
| KR | 1020180000292 A | 1/2018 |
| KR | 1020180020029 A | 2/2018 |
| TW | 201544536 A | 12/2015 |

(Continued)

OTHER PUBLICATIONS

Office Action of Japanese Patent Office in Appl'n No. 2018-546854, dated Jul. 22, 2019.
Office Action of Japanese Patent Office in Appl'n No. 2018-546854, dated Mar. 16, 2020.
Office Action of Chinese Patent Office in Appl'n No. 201780011999. 1, dated Mar. 24, 2020.

Primary Examiner — Sophie Hon
(74) Attorney, Agent, or Firm — Dentons US LLP

(57) ABSTRACT

The optical film according to the present invention has a feature that it has high adhesiveness and excellent property of blocking UV light even while using an acrylic resin having no ring structure in the main chain.

10 Claims, No Drawings

(56) References Cited

FOREIGN PATENT DOCUMENTS

WO      2015159552 A1    10/2015
WO      2015162926 A1    10/2015

\* cited by examiner

OPTICAL FILM WITH HIGH ADHESIVENESS AND EXCELLENT PROPERTY OF BLOCKING UV LIGHT, AND POLARIZING PLATE COMPRISING THE SAME

CROSS-REFERENCE TO RELATED APPLICATION(S)

This application is a National Stage Application of International Application No. PCT/KR2017/010255, filed Sep. 19, 2017, and claims the benefit of Korean Patent Application No. 10-2016-0120102 filed on Sep. 20, 2016 and Korean Patent Application No. 10-2017-0119828 filed on Sep. 18, 2017, contents of which are incorporated herein by reference in their entirety for all purposes as if fully set forth below.

TECHNICAL FIELD

The present invention relates to an optical film having high adhesiveness and excellent property of blocking UV light, and a polarizing plate comprising the same.

BACKGROUND ART

A liquid crystal display uses a polarized light. For this purpose, a polarizing plate is used, and typically, a PVA element is used. However, the polarizing plate, such as the PVA element, has weak mechanical properties of its own and is easily influenced by external environment, for example, temperature or humidity. Thus, a protective film for protecting the polarizing plate is required.

Such a protective film should have excellent optical properties and excellent mechanical properties. TAC films (Tri-Acetyl-cellulose Film) have been conventionally used as a protective film for the PVA elements used in the polarizing plates. In recent years, however, acrylic films having heat resistance and absorption resistance superior to TAC films have been used.

The acrylic films for protecting polarizing plate are prepared by a stretching process. In this regard, acrylic resins having a glass transition temperature of 120° C. or higher are generally used so that the dimensional changes at high temperatures are small and the optical properties can be stably maintained. In addition, in order to further improve the dimensional stability and optical properties of the acrylic resins, a ring structure is introduced into the main chain thereof, and to this end, a monomer having a ring structure, which imparts heat resistance, is introduced. However, when the monomer having a ring structure is introduced, not only the price of raw materials increases, but also processing must be performed at higher temperature, which are problematic.

Meanwhile, the acrylic resin, particularly polymethyl methacrylate (PMMA), has excellent transparency and thus can be used as a protective film for polarizing plates. However, the glass transition temperature is low and thus the stretch hysteresis is loosened at high temperature, which causes a deterioration in the dimensional stability. Further, when the polymethyl methacrylate is stretched and made into a film, there is a problem that the adhesiveness to a PVA element, which is a polarizing plate, varies depending on stretching conditions.

Accordingly, the present inventors have conducted extensive studies to prepare an optical film capable of exhibiting high adhesiveness to a PVA element, which is a polarizing plate, and having excellent property of blocking UV light, even while using an acrylic resin not containing monomers having a ring structure in the main chain thereof. As a result, they have found that an optical film produced by containing an ultraviolet absorber and a primer layer and stretching the film as described later satisfies the above requirements, thereby completing the present invention.

DETAILED DESCRIPTION OF THE INVENTION

Technical Problem

It is one object of the present invention to provide a biaxially stretched optical film having high adhesiveness to a polarizing plate and excellent property of blocking UV light.

It is another object of the present invention to provide a polarizing plate including the biaxially stretched optical film.

Technical Solution

In order to achieve the objects above, the present invention provides a biaxially stretched optical film including a substrate layer, and a primer layer formed on the substrate layer, wherein the substrate layer includes an acrylic resin and a ultraviolet absorber, and the primer layer includes 70 to 95 parts by weight of a polyester-based resin and 5 to 30 parts by weight of a polyurethane-based resin.

An acrylic resin has excellent transparency and thus can be used as an optical film, in particular, as a protective film for polarizing plate. However, when the acrylic resin is prepared as a film, a stretching process must be used in order to increase the mechanical strength, but because the acrylic resin has a low glass transition temperature, the optical film prepared by stretching has a problem that the stretch hysteresis is loosened at high temperature, which causes a deterioration in the dimensional stability. In order to improve such a problem, there has been suggested a method of introducing a ring structure in the main chain of the acrylic resin, but not only the preparation process is complex and the cost of base materials increases, but also processing must be performed at a higher temperature.

Further, when the acrylic resin is stretched, there is a problem that the adhesiveness to a PVA element, which is a polarizing plate, varies depending on stretching conditions.

Accordingly, in the present invention, there is provided an optical film capable of having high adhesiveness and excellent property of blocking UV light, by using a ultraviolet absorber and introducing a primer layer as described later.

Hereinafter, the present invention will be described in more detail.

Acrylic Resin

As used herein, the term 'acrylic resin' refers to a rein prepared by polymerization of acrylate-based monomers, and is the main component constituting the substrate layer in the present invention. In particular, the 'acrylic resin' has a feature that it does not contain a ring structure in the main chain.

Preferably, the acylate-based monomer has no ring structure in the main chain, and at least one selected from the group consisting of methyl methacrylate, methyl acrylate, ethyl acrylate, butyl acrylate, 2-ethylhexyl methacrylate, lauryl methacrylate and benzyl methacrylate can be used.

Further, the acrylic resin may further include a styrene-based monomer such as styrene, α-methylstyrene, p-methylstyrene, m-methylstyrene, benzoylstyrene or acrylonitrile, as needed.

The acrylic resin has a glass transition temperature of 100° C. to 120° C. If the glass transition temperature is less than 100° C., there is a problem that the thermal stability is deteriorated when produced into a film.

In addition, the acrylic resin has a weight average molecular weight of 100,000 to 150,000. If the weight average molecular weight is less than 100,000, there is a problem that the mechanical properties are deteriorated when produced into a film, and if the weight average molecular weight exceeds 150,000, there is problem that it would be difficult to carry out an extrusion process.

In particular, in the present invention, methyl methacrylate and/or methyl acrylate may be used as the acrylate-based monomer, and polymethyl methacrylate, which is a copolymer of methyl methacrylate and methyl acrylate, is preferred. Preferably, the polymethyl methacrylate includes 90 to 99% by weight of methyl methacrylate and 1 to 10% by weight of a methyl acrylate monomer. The methyl acrylate serves to inhibit the degradation of the copolymer.

The polymethyl methacrylate may be prepared by a known method, except that methyl acrylate is used in addition to methyl methacrylate. For example, it can be prepared by a method such as emulsion polymerization, emulsion-suspension polymerization, suspension polymerization, etc. In addition, in order to introduce a methyl acrylate monomer into the terminal of the polymethyl methacrylate, polymethyl methacrylate may be polymerized first, and then the methyl acrylate monomer may be polymerized.

Ultraviolet Absorber

In the present invention, the ultraviolet absorber is contained in the substrate layer and is used for effectively blocking ultraviolet light that enter from the outside.

As the ultraviolet absorber usable in the present invention, the biaxially stretched optical film according to the present invention can be used without particular limitation as long as it can have a light transmittance at a wavelength of 380 nm of 20% or less, preferably 10% or less, under the condition that the optical film has a thickness of 40 um. For example, as the ultraviolet absorber, a benzophenone-based ultraviolet absorber, a benzotriazole-based ultraviolet absorber, a triazine-based ultraviolet absorber, a salicylate-based ultraviolet absorber, and the like, which are well-known in the art, can be used.

Among them, a triazine-based ultraviolet absorber is preferable. In this case, the thermal stability and ultraviolet absorbing effect are excellent, and thus a sufficient ultraviolet blocking effect can be obtained even when contained in an appropriate amount. Furthermore, fume phenomenon or migration phenomenon that may occur during the film formation process can be prevented. Examples of the triazine-based ultraviolet absorber include a compound having a 2,4,6-triphenyl-1,3,5-triazine skeleton as a main component, and various triazine-based ultraviolet absorbers commercially available in the art can be used without particular limitation.

The ultraviolet absorber is preferably contained in an amount of 0.1 to 5 parts by weight based on 100 parts by weight of the acrylic resin. If the content of the ultraviolet absorber is less than the above range, it does not have a sufficient ultraviolet blocking effect. If the content of the ultraviolet absorber exceeds the above range, there is a problem that, while the ultraviolet absorber is decomposed in the process of producing the optical film, a migration phenomenon of migrating out of the film occurs.

Substrate Layer

In the present invention, the substrate layer is prepared as a composition containing the acrylic resin as described above. For example, the acrylic resin can be formed into an unstretched film, thereby preparing the substrate layer.

In addition, the substrate layer may further include a retardation controller for controlling the retardation. When the acrylic resin is stretched, it has a negative birefringence property in which the refractive index increases in a direction perpendicular to the stretching direction. Accordingly, in order to have zero retardation, a retardation controller having a positive birefringence property in which the refractive index increases in the stretching direction is required.

Preferably, the retardation controller may use a polycarbonate. As used herein, the term 'polycarbonate' is formed by reacting an aromatic diol compound with a carbonate precursor, and can be prepared by interfacial polymerization or solution polymerization. For example, it can be prepared by interfacial polymerization of bisphenol A and phosgene. In particular, in the present invention, the polycarbonate is a component constituting the substrate layer together with polymethyl methacrylate.

When the polycarbonate is additionally included, the weight average molecular weight of the polycarbonate is preferably 10,000 to 20,000 in consideration of its compatibility with the acrylic resin. When the weight average molecular weight of the polycarbonate exceeds 20,000, the compatibility with the acrylic resin is lowered, and an opaque composition is formed as a whole, which is not preferable for use as an optical film.

Furthermore, it is preferable that the polycarbonate is contained in an amount of 10% by weight or less in the substrate layer. If the content thereof exceeds 10% by weight, an opaque composition is formed as a whole, and the retardation is too much expressed, which is not preferable for implementing zero retardation. In addition, the polycarbonate is preferably contained in an amount of 1% by weight or higher or 2% by weight or higher in the substrate layer.

Further, the composition may include additives such as heat stabilizers, lubricants and the like, as needed. At this time, the additives may be contained in an appropriate amount within a range in which the physical properties of the composition are not impaired, and may be contained, for example, in an amount of 0.1 to 5 parts by weight based on 100 parts by weight of the entire composition.

Furthermore, as a method for preparing a film from the composition, any method known in the art, for example, a solution casting method, an extrusion method or the like may be used. In one example, a melt extrusion molding method may be used.

Specifically, the resin composition for optical materials is dried to remove moisture, and then an extruder is fed from a raw material hopper to a single or twin extruder, and the composition is melted at a high temperature to obtain a raw material pellet. The thus-obtained raw material pellet is then dried, melted by the single extruder from the raw material hopper to the extruder and then passed through a coat hanger type T-die, thereby forming a film via a chromium-plated casting roll, a cooling roll and the like. At this time, the film-molding temperature is preferably 150° C. to 350° C., more preferably 200° C. to 300° C. Meanwhile, as described above, when a film is formed by the T-die method, a T-die is attached to the tip of a known single- or twin-screw extruder, and a film extruded in the form of a film is wound to obtain a roll-shaped film. In addition, a polymer filter may be used to remove foreign substances during film molding.

Primer Layer

In the present invention, the primer layer is formed on the substrate layer, and may be formed on one surface or both surfaces of the substrate layer as needed. In particular, when an optical film is produced by biaxial stretching as described later, the primer layer of the present invention may improve the adhesiveness to the polarizing plate, for example, a PVA element.

The primer layer includes 70 to 95 parts by weight of a polyester-based resin and 5 to 30 parts by weight of a polyurethane-based resin. More preferably, the primer includes 75 to 90 parts by weight of a polyester-based resin and 10 to 25 parts by weight of a polyurethane-based resin.

The polyester-based resin refers to a resin including an ester group, which is formed by reacting carboxylic acid and alcohol in the main chain. Preferably, it may be a water-dispersible polyester resin, and more preferably, may include polyester glycol formed by reacting polybasic acid and polyol.

Herein, examples of the polybasic add component include an aromatic dicarboxylic acid such as ortho-phthalic add, isophthalic acid, terephthalic acid, 1,4-naphthalene dicarboxylic add, 2,5-naphthalene dicarboxylic add, 2,6-naphthalene dicarboxylic add, biphenyl dicarboxylic add, tetrahydrophthalic add and the like; an aliphatic dicarboxylic add such as oxalic add, succinic acid, malonic add, glutaric add, adipic acid, pimelic add, suberic acid, azelaic add, sebacic acid, linoleic add, maleic acid, fumaric acid, mesaconic acid, itaconic add, and the like; an alicyclic dicarboxylic acid such as hexahydrophthalic acid, tetrahydrophthalic acid, 1,3-cyclohexane dicarboxylic add, and 1,4-cyclohexane dicarboxylic add; or a reactive derivative thereof such as an add anhydride, an alkyl ester, and an acid halide, but are not limited thereto, and the component may include at least one or two selected from the group consisting of these components. Among these components, terephthalic add, isophthalic acid, succinic acid and the like are particularly preferred. Further, when an isophthalic add substituted with a sulfonic add salt is used as a basic add, it is particularly preferred in terms of water dispersibility.

The polyol is not particularly limited as long as the polyol has two or more hydroxyl groups in the molecule. Examples of the polyol include, preferably, at least one selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxy phenyl propane, 4,4'-dihydroxy methyl methane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose; sucrose and sorbitol. In addition, when the polyol includes at least one or two selected from the group consisting of dimethylol alkanoic acid, dimethylol acetic acid, dimethylol propionic acid and dimethylol butyl acid, it is particularly preferred in terms of water dispersibility.

It is preferred that the polyester glycol is formed by reacting the polybasic acid and polyol at a molar ratio of 2.5:1 to 1:2.5, preferably 2.3:1 to 1:2.3, more preferably 2:1 to 1:2. When the reaction molar ratio of the polybasic acid and polyol deviates from the range described above, odor is generated by unreacted monomers, or defective coating may be caused.

The method of preparing the polyester resin may be performed by a method well-known in the art, for example, a method of performing an esterification reaction of polybasic acid and polyol, and then performing a polycondensation, or a method of performing an esterification reaction of polybasic acid anhydride and polyol, and then performing a polycondensation, and the like Specifically, the methods may include (1) a raw material mixing step of obtaining a raw material mixture by mixing polymerization raw materials for polymerization of polyester, (2) an esterification reaction step of esterifying the raw material mixture, and (3) a polycondensation step of obtaining polyester by polycondensating the esterified raw material mixture.

Meanwhile, the polyester-based resin prepared by the aforementioned method may include a repeating unit represented by Chemical Formula 1 below:

[Chemical Formula 1]

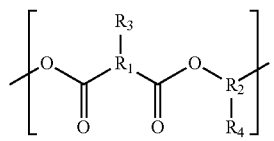

in Chemical Formula 1, $R_1$ and $R_2$ are each independently a $C_{1-20}$ alkylene group, a $C_{6-20}$ arylene group, or a $C_{5-20}$ cycloalkylene group, $R_3$ and $R_4$ are substituent groups each substituted with $R_1$ and $R_2$, and are each independently hydrogen, a carboxyl group, a hydroxyl group, a sulfonate group, a $C_{1-20}$ alkyl group, a $C_{6-20}$ aryl group, or a $C_{5-20}$ cycloalkyl group, with a proviso that at least one of $R_3$ and $R_4$ is a carboxyl group, a hydroxyl group, or a sulfonate group.

Preferably, $R_3$ or $R_4$ is a carboxyl group or a sulfonate group.

More preferably, the polyester resin may include a repeating unit represented by Chemical Formula 2 below:

[Chemical Formula 2]

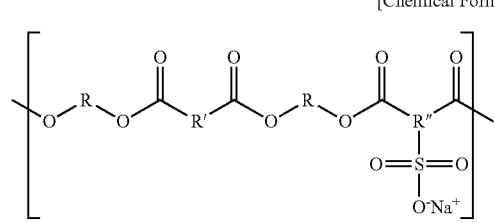

in Chemical Formula 2,

R, R' and R" are each independently a $C_{1-20}$ alkylene group, a $C_{6-20}$ arylene group, or a $C_{5-20}$ cycloalkylene group, and $SO_3Na$ refers to a substituent group substituted to R".

Meanwhile, the polyester resin may further include additional components in addition to the above components within a range in which physical properties of the present invention are not impaired.

The polyurethane-based resin refers to a resin including a urethane repeating unit, which is formed by a reaction between isocyanate and polyol in the main chain. Herein, the isocyanate is a compound having two or more NCO groups, and the polyol is a compound having two or more hydroxyl groups, and examples thereof include a polyester-based polyol, a polycarbonate-based polyol, a polyether polyol, and the like, but are not limited thereto.

Specifically, examples of the diisocyanate include toluene diisocyanate (TDI), 4,4-diphenyl methane diisocyanate (MDI), 1,5-naphthalene diisocyanate (NDI), tolidine diisocyanate (TODI, hexamethylene diisocyanate (HMDI), isopron diisocyanate (IPDI), p-phenylene diisocyanate, trans-cyclohexane, 1,4-diisocyanate and xylene diisocyanate (XDI), and the like, but are not limited thereto. One or two or more selected from the group consisting of the above exemplified diisocyantes can be included.

The polyester-based polyol may be obtained by reacting a polybasic add component with a polyol component. Herein, examples of the polybasic add component include an aromatic dicarboxylic acid such as ortho-phthalic add, isophthalic acid, terephthalic acid, 1,4-naphthalene dicarboxylic acid, 2,5-naphthalene dicarboxylic acid, 2,6-naphthalene dicarboxylic add, biphenyl dicarboxylic add, tetrahydrophthalic add and the like; an aliphatic dicarboxylic add such as oxalic acid, succinic add, malonic acid, glutaric acid, adipic acid, pimelic add, suberic add, azelaic add, sebacic acid, linoleic acid, maleic acid, fumaric acid; mesaconic add, itaconic acid and the like; an alicyclic dicarboxylic add such as hexahydrophthalic add, tetrahydrophthalic acid, 1,3-cyclohexane dicarboxylic add, 1,4-cyclohexane dicarboxylic add and the like; or a reactive derivative thereof such as an acid anhydride, an alkyl ester, and an add halide, but are not limited thereto. One or two or more selected from the group consisting of the above-exemplified components can be included.

In addition, the polycarbonate-based polyol may be obtained by reacting a compound having a carbonate group with the polyol component. Herein, examples of the compound having a carbonate group include diphenyl carbonate, dialkyl carbonate, alkylene carbonate, and the like, but are not limited thereto.

Meanwhile, the polyether polyol may be obtained by ring-opening polymerization of alkylene oxide with the polyol component.

The polyol component is not particularly limited as long as the polyol component has two or more hydroxyl groups in the molecule. For example, the polyol may preferably include, preferably, at least one selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxy phenyl propane, 4,4'-dihydroxy methyl methane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. Among them, at least one selected from the group consisting of polytetramethylene glycol (PTMG), polypropylene glycol (PPG), and polyethylene glycol (PEG) is particularly preferred.

Meanwhile, the polyurethane-based resin may further include other polyols or chain extenders in addition to the above components within a range in which physical properties of the present invention are not impaired.

Examples of the other polyols include polyols having three or more hydroxyl groups, such as sorbitol, glycerin, trimethylolethane, trimethylolpropane, pentaerythritol and the like, but are not limited thereto.

Examples of the other chain extenders include glycols such as ethylene glycol, diethylene glycol, triethylene glycol, 1,3-propanediol, 1,3-butanediol, 1,4-butanediol, neopentyl glycol, pentanediol, 1,6-hexanediol, propyleneglycol and the like, but are not limited thereto.

Meanwhile, the polyurethane-based resin may further include a neutralizing agent, as needed. When the neutralizing agent is included, the stability of the urethane resin in water phase is improved. Examples of the neutralizing agent may include one or two or more selected from the group consisting of ammonia N-methylmorpholine, triethylamine, dimethylethanolamine, methyldiethanolamine, triethanolalkyne, morpholine, tripropylamine, ethanolamine, and tri-isopropanolamine.

It is preferred that the preparation of the polyurethane-based resin is performed in an organic solvent which is inert to the isocyanate and compatible with water. The organic solvent may include one or two or more selected from the group consisting of an ester-based solvent such as ethyl acetate, ethyl cellosolve acetate and the like, a ketone-based solvent such as acetone, methyl ethyl ketone, methyl isobutyl ketone, and the like, and an ether-based solvent such as dioxane tetrahydrofuran, and the like.

Further, the polyurethane-based resin may be prepared through a one-shot method and a multistage method, and the like, which are well-known in the art. Specifically, the one-shot method is a method of reacting each component at a time, and the multistage method is a method of reacting each component stepwise. In addition, a urethane reaction catalyst may be further included when the polyurethane-based resin is prepared.

Meanwhile, the polyurethane resin is not limited thereto, but in particular, is preferably a carbonate-based polyurethane resin which uses a polycarbonate-based polyol as a reactant, or an ester-based polyurethane resin which uses a polyester-based polyol as a reactant, from the viewpoint of dispersibility and transparency.

Further, it is preferred that the polyurethane-based resin has a weight average molecular weight of 10000 to 1,000,000. If the weight average molecular weight of the polyurethane-based resin satisfies the numerical range, it can realize sufficient adhesiveness and excellent in water dispersibility.

According to an exemplary embodiment of the present invention, it is preferred that the polyurethane-based resin includes one or more functional groups selected from the group consisting of a carboxyl group, a hydroxyl group, a sulfonate group, and a tertiary amine group. When the functional groups are included in the polyurethane-based resin, the adhesiveness and water dispersibility for the adhesive layer are significantly improved. Meanwhile, the polyurethane-based resin including the functional group may be prepared by a method of using a compound including the functional groups as the polyol and/or isocyanate, or adding a chain extender including the functional groups during the reaction of polyol and isocyanate. For example, the polyurethane-based resin including a carboxyl group or a tertiary amine group may be prepared by adding a chain extender having a free carboxyl group or a free amine group to perform reaction during the reaction of polyester polyol and isocyanate. Herein, examples of the chain extender having a free carboxyl group include dihydroxy carboxylic acid, dihydroxy succinic acid, and the like, but are not limited thereto. Examples of the dihydroxy carboxylic acid may include one or two or more selected from the group consisting of dialkylol alkanoic adds including a dimethylol alkanoic add such as dimethylol acetic add, dimethylol butanoic add, dimethylol propionic acid, dimethylol butyric acid, dimethylol pentanoic acid and the like, Meanwhile, examples of the chain extender including a free amine group include aliphatic diamines such as ethylenediamine, propylenediamine, hexamethylenediamine, 1,4-butanediamine, aminoethylethanolamine and the like; alicyclic diamines such as isophoronediamine, 4,4'-dicyclohexylmethanediamine and the like; aromatic diamines such as xylenediamine, tolylenediamine and the like, but are not limited thereto, and the chain extender may be those including one or two or more selected from the group consisting of these amines.

Meanwhile, the polyurethane resin may further include additional components in addition to the above components within a range in which physical properties of the present invention are not impaired.

In addition, the primer layer may further include water-dispersible fine particles and water-dispersible crosslinking agent as needed. As the water-dispersible fine particles, at least one selected from the group consisting of silica, titania, alumina, zirconia, and antimony-based fine particles may be used, and preferably, silica may be used. When silica is used, colloidal silica may be preferably used. The diameter of the water-dispersible fine particles is 50 nm to 500 nm, preferably 70 nm to 300 nm.

The primer layer may be prepared by coating a primer solution including the polyester-based resin and polyurethane-based resin, and the coating method is not particularly limited. For example, a bar coating method, a microgravure coating method, a slot die coating method, a comma coating method and the like may be used.

In addition, the primer layer may have an antistatic property as needed. To this end, the primer layer may include a surfactant, an organic salt, an inorganic salt, a conductive filler, a conductive polymer, a block copolymer, metal oxide and the like in an amount of 0.1 to 10% by weight. Further, the primer layer may have an UV-blocking property as needed. To this end, the primer layer may include a ultraviolet absorber in an amount of 0.1 to 10% by weight. The ultraviolet absorber is not particularly limited as long as it is used for an optical film, and for example, a triazine-based, a benzotriazole-based, or a benzophenol-based ultraviolet absorber may be used. Furthermore, the primer layer may have an anti-blocking property as needed. To this end, the primer layer may include organic beads or inorganic beads.

When the aforementioned primer layer is used, the slip property can be imparted to the substrate layer to provide an anti-blocking effect, and there is an effect that prevents the erosion of the substrate layer from the coating solution during coating. In addition, as described later, the adhesiveness to the primer layer may be improved while maintaining the properties of each layer even in the biaxial stretching of the primer layer with the substrate layer.

Biaxially Stretched Optical Film

The biaxially stretched optical film according to the present invention includes the aforementioned substrate layer and a primer layer formed on the substrate layer. The biaxial stretching means that an unstretched film including a substrate layer and a primer layer is biaxially stretched, or that a substrate layer is uniaxially stretched in the longitudinal direction, and then a primer layer is formed, which is stretched in the traverse direction.

Specifically, the biaxially stretched optical film is prepared by a preparation method including the steps of preparing an unstretched film by forming the aforementioned substrate layer and a primer layer on the substrate layer; and biaxially stretching the unstretched film. Alternatively, the biaxially stretched optical film according to the present invention is prepared by a preparation method including the steps of stretching the aforementioned substrate layer in the longitudinal direction; forming a primer layer on the substrate layer; and stretching the substrate layer and the primer layer in the traverse direction.

Preferably, the stretching magnification is 1.2 times to 3.0 times in the MD direction and 1.5 times to 4.0 times in the TD direction. The stretching aligns the polymers and has an effect on the properties of the biaxially stretched optical film prepared according to the degree of stretching. More preferably, the ratio of the stretching magnification in the MD direction to the stretching magnification in the TD direction (TD stretching magnification/MD stretching magnification) is 1.0 to 2.5

Further, it is preferred that the stretching is performed within a temperature range of −10° C. to +20° C. based on the glass transition temperature. The stretching temperature has an effect on the adhesiveness of the biaxially stretched optical film, and there is a problem that the adhesiveness may not be sufficient if the temperature is out of the range.

Furthermore, the biaxially stretched optical film according to the present invention has excellent dimensional stability, and in order to evaluate such thermal dimensional stability, a variable known as TTS (Temperature of Thermal Shrinkage) was introduced.

TTS refers to a temperature at which an optical film prepared in the stretching step starts to shrink sharply while the stretch hysteresis is loosened. Specifically, when the temperature is applied to the optical film, it refers to a temperature at which an optical film starts to shrink after expansion as the temperature increases. Preferably, the TTS in the MD direction and the TTS in the TD direction of the biaxially stretched optical film according to the present invention are 95° C. or higher, and preferably 100° C. to 120° C., respectively.

Further, the optical film according to the present invention has excellent property of blocking UV light, specifically, it has a feature that the light transmittance at a wavelength of 380 nm is 20% or less, preferably 10% or less under the condition that the optical film has a thickness of 40 um. This is due to the ultraviolet absorber being contained in the substrate layer. Preferably, the transmittance at 380 nm is 9% or less, 8% or less, 7% or less, 6% or less, or 5% or less. Further, the transmittance at 380 nm is excellent as the value thereof is smaller, and thus the lower limit thereof is theoretically 0%. For example, the lower limit thereof may be 0.5%, 1%, or 2%.

Meanwhile, the thickness of the biaxially stretched optical film according to the present invention may be appropriately adjusted as needed, and for example, it may preferably be 10 um to 100 um.

Polarizing Plate

In addition, the present invention provides a polarizing plate including the biaxially stretched optical film. As described above, the biaxially stretched optical film according to the present invention can be used as a protective film for a polarizing plate and accordingly, it can supplement the mechanical properties of the polarizing plate and protect the polarizing plate from the external environment, for example, from the influence of temperature or humidity.

As used herein, the polarizing plate means a state in which a polarizer and a protective film are included. Herein, the primer layer of the protective film according to the present invention may be adhered to the polarizer, or the substrate layer of the protective film according to the present invention may be adhered to the polarizer. As the polarizer, a film composed of polyvinyl alcohol (PVA) including iodine or a dichroic dye may be used. The polarizer can be prepared by impregnating iodine or a dichroic dye into a PVA film, but the preparation method thereof is not particularly limited.

Further, the protective film according to the present invention may be provided on both surfaces of the polarizer, or may be provided only on one surface of the polarizer. When the optical film of the present invention is provided on one surface of the polarizer, on the other surface, a polarizer protective film such as an acrylic film, a TAC film, a PET film, a COP film, a PC film, a norbornene-based film or the like, which are well known in the art, can be used without limitation.

Meanwhile, an adhesive may be used for providing the protective film according to the present invention on the polarizer. A non-water-based adhesive may be preferably used as the adhesive, and more preferably, a UV-curable adhesive may be used. Examples of the adhesive include adhesives using a light radical polymerization reaction such as (meth)acrylate-based adhesives, ene/thiol-based adhesives, and unsaturated polyester-based adhesives; or adhesives using a light cationic polymerization reaction such as epoxy-based adhesives, oxetane-based adhesives, epoxy/oxetane-based adhesives, and vinyl ether-based adhesives, and the like, but are not limited thereto. When the non-water-based adhesive is used, a method is performed in which the non-water-based adhesive is coated onto one surface of the polarizer or protective film to form an adhesive layer, the polarizer is laminated with the optical film, and then the adhesive layer is cured through light irradiation.

In addition, the present invention provides an image display device including the polarizing plate, and more preferably, it may be a liquid crystal display device. For example, the liquid crystal display device according to the present invention is a liquid crystal display device including a liquid crystal cell, and a first polarizing plate and a second polarizing plate each provided both surfaces of the liquid crystal cell, wherein at least one of the first polarizing plate and the second polarizing plate is the polarizing plate according to the present invention. That is, the optical film according to the present invention can be provided on the opposite side of the liquid crystal cell surface with respect to the first polarizing plate, on the opposite side of the liquid crystal cell surface with respect to the second polarizing plate, or both. The optical film or the polarizer protective film provided on the opposite side of the polarizing plate from the liquid crystal cell can be subjected to surface coating, such as AG or LR coating.

Advantageous Effects

As described above, the biaxially stretched optical film according to the present invention has high adhesiveness and excellent property of blocking UV light even while using an acrylic resin not containing monomers having a ring structure.

DETAILED DESCRIPTION OF THE EMBODIMENTS

Hereinafter, preferred examples are presented to aid in the understanding of the invention. However, the following examples are provided only to facilitate understanding of the present invention, and the scope of the present invention is not limited thereto.

Preparation Example 1: Polymethyl Methacrylate 1000 g of a monomer mixture containing 98 wt % of methyl methacrylate and 2 wt % of methyl acrylate were added to a 5 L reactor, and 2000 g of distilled water, 8.4 g of a 5% polyvinyl alcohol solution (POVAL PVA217, manufactured by Kuraray Co., Ltd.) and 0.1 g of boric add as a dispersion aid were added and dissolved. 2.5 g of n-octyl mercaptane as a chain transfer agent and 1.5 g of 2,2'-azobisisobutyronitrile as a polymerization initiator were added thereto and dispersed in water phase while stirring at 400 rpm to prepare a suspension solution. The temperature was raised to 80° C. to carry out polymerization for 90 minutes, and then the resultant was cooled to 30° C. The thus-obtained beads were washed with distilled water, dehydrated and then dried to prepare a polymethyl methacrylate resin. The glass transition temperature and the molecular weight of the prepared resin were measured, and as a result, the glass transition temperature was 115° C., and the weight average molecular weight was 120,000. The glass transition temperature was measured using a differential scanning calorimeter (DSC) manufactured by Mettler Toledo at a temperature rising rate of 10° C./min Preparation Example 2: Polycarbonate As the polycarbonate, a polycarbonate resin having a glass transition temperature of 134° C. and a weight average molecular weight of 16,000 was used (UF 1004A, manufactured by LG Chem).

Preparation Example 3: Primer Solution

The polyester-based resin (A-645GH; Takamatsu Oil & Fat; the total solid content excluding water: 30% by weight) and polyurethane-based resin (CK-PUD-PF; Chokwang Paint, the total solid content excluding water: 30% by weight) were mixed at a weight ratio of 80:20 based on the solid content. Hereto, 5% by weight of aqueous silica was mixed to prepare a primer solution.

Preparation Example 4: Primer Solution

A primer solution was prepared in the same manner as in Preparation Example 3, except that the polyester-based resin and polyurethane-based resin were mixed at a weight ratio of 20:80 based on the solid content.

Preparation Example 5: Primer Solution

A primer solution was prepared in the same manner as in Preparation Example 3, except that only the polyurethane-based resin was used.

Preparation Example 6: Primer Solution

A primer solution was prepared in the same manner as in Preparation Example 3, except that the polyester-based resin and polyurethane-based resin were mixed at a weight ratio of 65:35 based on the solid content.

Preparation Example 7: Primer Solution

A primer solution was prepared in the same manner as in Preparation Example 3, except that only the polyester-based resin was used.

Examples 1 to 3 and Comparative Examples 1 to 3

The polymethyl methacrylate prepared in Preparation Example 1, the polycarbonate of Preparation Example 2 and an ultraviolet absorber (LAP 70, manufactured by Adeka Corp.) were respectively added as shown in Table 1 below, to which an antioxidant (Irganox 1010, manufactured by BASF) was added in an amount of 0.4 phi and dry blended, followed by compounding with a twin extruder to prepare a resin composition. The resin composition was melted at 265° C. and subjected to extrusion casting in the form of a sheet through a T-die to obtain a sheet having a thickness of 180 um. The sheet was uniaxially stretched in the MD direction, and then a primer layer was formed from the primer solution prepared in Production Example 3 using a bar coater. The primer layer was stretched in the TD direction to prepare a biaxially stretched film. The stretching temperature and stretching magnification are as shown in Table 1 below.

Comparative Example 4

An optical film was prepared in the same manner as in Example 1, except that the primer solution of Preparation Example 4 was used instead of the primer solution of Preparation Example 3.

Comparative Example 5

An optical film was prepared in the same manner as in Example 1, except that the primer solution of Preparation Example 5 was used instead of the primer solution of Preparation Example 3.

Comparative Example 6

An optical film was prepared in the same manner as in Example 1, except that the primer solution of Preparation Example 6 was used instead of the primer solution of Preparation Example 3.

Comparative Example 7

An optical film was prepared in the same manner as in Example 1, except that the primer solution of Preparation Example 7 was used instead of the primer solution of Preparation Example 3.

Experimental Example

The optical films prepared in Examples and Comparative Examples above were evaluated by the following methods.

1) Transmittance at 380 nm: The transmittance at 380 nm was measured using Hitachi U-3310. At this time, the thickness of the optical film was 40 um.

2) TTS (Temperature of Thermal Shrinkage): The optical films were measured with a TMA (Q400) apparatus after preparing a sample with dimensions of 10 mm×4.5 mm. Specifically, when the temperature was applied under the conditions of a temperature raising rate of 10° C./min and a load of 0.02 N, the inflection point temperature (tangential slope of 0) at which the sample begins to contract after expansion in the MD and TD directions was set as the TTS value.

3) Retardation Value: The retardation value was measured at a wavelength of 550 nm using a birefringence meter (AxoScan, manufactured by Axometrics). As the measured values for the refractive index (nx) in the x-axis direction, the refractive index (ny) in the y-axis direction, and the refractive index nz in the z-axis direction, the in-plane retardation (Rin) and the retardation (Rth) in the thickness direction were calculated according to Mathematical Formulas below.

$$Rin(nm)=(nx-ny) \times d$$

$$Rth=(nz-ny) \times d$$

wherein nx represents a refractive index in the direction in which the refractive index is the largest in a plane of the optical film, ny represents a refractive index in the direction perpendicular to nx, nz represents a refractive index in the thickness direction of the optical film, and d represents the thickness (nm) of the optical film.

4) Adhesive strength (90° peel strength): Adhesive strength was measured using a TA.XT.plus Texture Analyzer (Stable Micro Systems). Specifically, common acrylic optical film/PVA element/the optical film prepared above were sequentially laminated. Herein, two types thereof were prepared, namely, one in which the primer surface of the optical film faced the PVA element, and the other in which the surface (substrate surface) opposite to the primer surface of the optical film faced the PVA element. An UV-curable adhesive was applied between the respective films, and the conditions were set so that the final adhesive layer had a thickness of 1 to 2 um, and passed through a laminator. Then, an UV light was irradiated on the surface of the common acrylic optical film. A specimen with a width of 2 cm was prepared, and a part of the specimen was peeled off at a speed of 300 mm/min, 90° from the PVA element using a TA.XT.plus Texture Analyzer to measure the peel strength. The remaining part of the specimen was stored at 80° C. for 500 hours, and then the peel strength was measured in the same manner.

The results are shown in Tables 1 and 2 below. In Table 2, values obtained in Example 1 were re-written for comparison.

TABLE 1

|  | Ex. 1 | Ex. 2 | Ex. 3 | Comparative Ex. 1 | Comparative Ex. 2 | Comparative Ex. 3 |
|---|---|---|---|---|---|---|
| Polymethyl methacrylate | 100 wt % | 100 wt % | 97.3 wt % | 97.3 wt % | 100 wt % | 97.3 wt % |
| Polycarbonate | — | — | 2.7 wt % | 2.7 wt % | — | 2.7 wt % |
| Ultraviolet absorber(phr)[1] | 0.8 | 0.8 | 0.8 | 0.8 | 0.8 | — |
| Glass transition temperature[2] (Tg) | 114° C. | 114° C. | 114° C. | 114° C. | 114° C. | 114° C. |
| Stretching temperature | Tg + 15° C. | Tg + 20° C. | Tg + 20° C. | Tg + 25° C. | Tg + 25° C. | Tg + 20° C. |
| Stretching magnification(MD/TD) | 1.8/2.56 | 1.8/2.56 | 1.8/2.56 | 1.8/2.56 | 1.8/2.56 | 1.8/2.56 |
| Transmittance at 380 nm (%) | 4.7 | 4.5 | 4.5 | 4.7 | 4.5 | 91 |

TABLE 1-continued

|  | Ex. 1 | Ex. 2 | Ex. 3 | Comparative Ex. 1 | Comparative Ex. 2 | Comparative Ex. 3 |
|---|---|---|---|---|---|---|
| TTS(MD/TD, ° C.) | 103/102 | 105/104 | 105/103 | 107/105 | 106/105 | 106/105 |
| Retardation (Rin/Rth) | 1.0/16 | 1.2/13.5 | 1.1/0.7 | 0.3/0.8 | 0.8/12.5 | 0.5/0.8 |
| Adhesive strength of primer layer (N/20 mm) | 1.8 | 1.1 | 1.1 | 0.3 | 0.4 | 1.5 |
| Adhesive strength of substrate layer (N/20 mm) | 1.4 | 0.9 | 0.8 | 0.3 | 0.3 | 1.1 |

[1] Part by weight relative to total 100 parts by weight of polymethyl methacrylate and polycarbonate
[2] Glass transition temperature of polymethyl methacrylate

TABLE 2

|  | Ex. 1 | Comparative Ex. 4 | Comparative Ex. 5 | Comparative Ex. 6 | Comparative Ex. 7 |
|---|---|---|---|---|---|
| Polymethyl methacrylate | 100 wt % | 100 wt % | 100 wt % | 100 wt % | 100 wt % |
| Polycarbonate | — | — | — | — | — |
| Ultraviolet absorber (phr)[1] | 0.8 | 0.8 | 0.8 | 0.8 | 0.8 |
| Glass transition temperature[2](Tg) | 114° C. | 114° C. | 114° C. | 114° C. | 114° C. |
| Stretching temperature | Tg + 15° C. | Tg + 15° C. | Tg + 15° C. | Tg + 15° C. | Tg + 15° C. |
| Stretching magnification(MD/TD) | 1.8/2.56 | 1.8/2.56 | 1.8/2.56 | 1.8/2.56 | 1.8/2.56 |
| TTS(MD/TD, ° C.) | 103/102 | 103/102 | 103/102 | 104/103 | 104/103 |
| Retardation (Rin/Rth) | 1.0/16 | 0.9/16 | 1.0/15 | 0.5/1.0 | 0.5/1.1 |
| Adhesive strength of primer layer (N/20 mm) | 1.8 | 0.4 | 0.2 | 0.6 | 2.0 |
| Adhesive strength (N/20 mm)of primer surface after high-temperature reliability (80° C., 500 hr) | 1.6 | 0.2 | 0.2 | 0.4 | 0.4 |
| Adhesive strength of substrate layer (N/20 mm) | 1.4 | 1.4 | 1.5 | 1.7 | 1.7 |

[1] Part by weight relative to total 100 parts by weight of polymethyl methacrylate and polycarbonate
[2] Glass transition temperature of polymethyl methacrylate As shown in Table 1, Examples 1 to 3 according to the present invention all exhibited the transmittance at 380 nm of 5% or less and had high adhesive strength of 1 N/20 mm or higher. In contrast, Comparative Examples 1 and 2 exhibited low adhesive strength of less than 0.5 N/20 mm because the stretching temperature was too high. In addition, during the adhesion of the substrate surface, Examples 1 to 3 all exhibited high adhesive strength, whereas Comparative Examples 1 and 2 exhibited low adhesive strength of less than 0.5 N/20 mm due to excessive high stretching temperature. Further, Comparative Example 3 did not contain a ultraviolet absorber and thus exhibited high transmittance at 380 nm, which did not substantially absorb ultraviolet hall.

In addition, as shown in Table 2, it was confirmed that, compared to Example 1 according to the present invention, Comparative Examples 4 to 7 could not achieve effective adhesive strength because the composition for the primer layer did not satisfy that of the present invention. In the case of Comparative Example 7, it was confirmed that the initial adhesive strength was achieved, but the adhesive strength was deteriorated after a long-term exposure to high temperature.

Accordingly, it was confirmed that the optical film according to the present invention exhibited excellent property of blocking UV light even while having high adhesive strength.

The invention claimed is:

1. A biaxially stretched optical film comprising: a substrate layer, and a primer layer formed on a surface of the substrate layer, wherein the substrate layer is an acrylic resin film which consists essentially of an acrylic resin, a polycarbonate resin in an amount of 1% or more and 10% by weight or less, and an ultraviolet absorber, and the primer layer includes a mixture comprising 70 to 95 parts by weight of a polyester-based resin and 5 to 30 parts by weight of a polyurethane-based resin,
   wherein the polyester-based resin is a water-dispersible polyester resin and the polyurethane-based resin is a water-dispersible polyurethane resin, and
   wherein the acrylic resin has a negative birefringence property and does not include a ring structure in the main chain, and the polycarbonate resin has a positive birefringence property,
   wherein at least the substrate layer is biaxially stretched, and the primer layer is stretched together with the substrate layer at least in a transverse (TD) direction relative to a longitudinal (MD) direction, the magnification of the biaxial stretching being 1.2 times to 3.0 times in the MD direction and 1.5 times to 4.0 times in the TD direction, and
   wherein the biaxially stretched optical film exhibits a transmittance at 380 nm of 5% or less at a thickness of 40 μm, and an adhesive strength of the primer layer in the biaxially stretched film is 1 N/20 mm or higher even after storage at 80° C. for 500 hours.

2. The biaxially stretched optical film of claim 1, wherein the acrylic resin has a glass transition temperature of 100 to 120° C.

3. The biaxially stretched optical film of claim 1, wherein the acrylic resin has a weight average molecular weight of 100,000 to 150,000.

4. The biaxially stretched optical film of claim 1, wherein the acrylic resin is a copolymer of methyl methacrylate and methyl acrylate.

5. The biaxially stretched optical film of claim 4, wherein the acrylic resin includes 90 to 99% by weight of methyl methacrylate and 1 to 10% by weight of methyl acrylate monomer.

6. The biaxially stretched optical film of claim 1, wherein the ultraviolet absorber is contained in an amount of 0.1 to 5 parts by weight based on 100 parts by weight of the acrylic resin.

7. The biaxially stretched optical film of claim 1, wherein the polycarbonate has a weight average molecular weight of 10,000 to 20,000.

8. The biaxially stretched optical film of claim 1, wherein the primer layer includes 75 to 90 parts by weight of a polyester-based resin and 10 to 25 parts by weight of a polyurethane-based resin.

9. The biaxially stretched optical film of claim 1, wherein the ratio of the stretching magnification in the MD direction to the stretching magnification in the TD direction (TD stretching magnification/MD stretching magnification) is 1.0 to 2.5.

10. A polarizing plate comprising the biaxially stretched optical film of claim 1.

\* \* \* \* \*